United States Patent [19]

Ito et al.

[11] Patent Number: 4,762,534

[45] Date of Patent: Aug. 9, 1988

[54] METHOD OF PRODUCING MAGNETIC DISK

[75] Inventors: Yasushi Ito, Minami-ashigara; Masaaki Imamura, Odawara; Yoshiki Kato, Tokyo; Jun Fumioka, Hadano, all of Japan

[73] Assignee: Hitachi, Ltd., Tokyo, Japan

[21] Appl. No.: 935,336

[22] Filed: Nov. 26, 1986

[30] Foreign Application Priority Data

Nov. 27, 1985 [JP] Japan .................................. 60-266926

[51] Int. Cl.⁴ .............................................. B24D 3/00
[52] U.S. Cl. ........................................ 51/293; 51/295; 51/308; 51/309; 428/329; 428/331
[58] Field of Search ................. 51/293, 295, 308, 309; 428/329, 331

[56] References Cited

U.S. PATENT DOCUMENTS 3,618,272 11/1971 Whalen et al. ........................ 51/293
4,047,232 9/1977 Hisagen et al. ...................... 428/900
4,246,003 1/1981 Regler et al. ......................... 51/293
4,275,108 6/1981 Yamaguchi et al. ................. 428/329
4,532,172 7/1985 Fujiyama ............................. 428/900
4,608,293 8/1986 Wada et al. ......................... 428/141
4,613,545 9/1986 Chubachi et al. ................... 428/329
4,668,568 5/1987 Fujiyama et al. ................... 428/329

Primary Examiner—Paul Lieberman
Assistant Examiner—Willie J. Thompson
Attorney, Agent, or Firm—Antonelli, Terry & Wands

[57] ABSTRACT

A method of producing a magnetic disk by lapping a magnetic disk medium, comprising the steps of:
preparing a lapping tape having an abrasive particle layer provided with abrasive particle clusters and chip pockets formed between adjacent two clusters, each of said clusters having abrasive particles of Al₂O₃ or SiC and abrasive particles of diamond,
lapping the surface of said magnetic disk medium by using the thus prepared lapping tape.

17 Claims, 4 Drawing Sheets

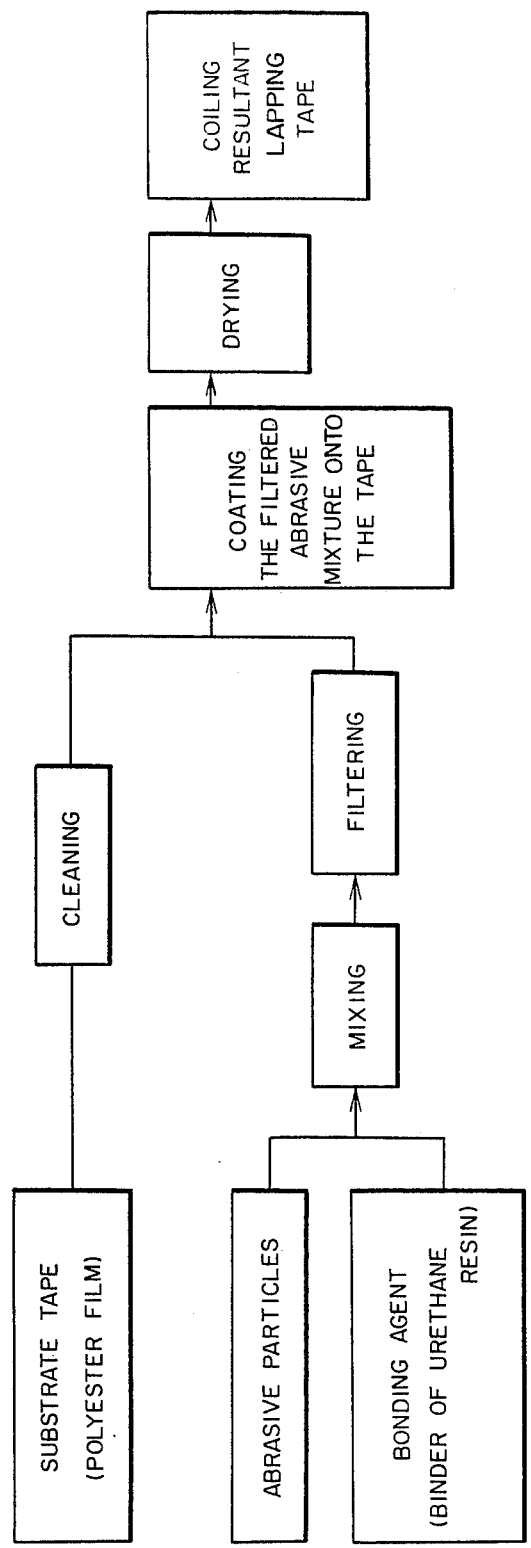

WORKING A

WORKING B

METHOD OF PRODUCING MAGNETIC DISK

BACKGROUND OF THE INVENTION

The present invention relates to a method of producing a magnetic disk, and more particularly to a method of producing a magnetic disk which method uses a lapping tape suitable for lapping the surface of a magnetic disk containing hard fillers (such as particles of $Al_2O_3$, SiC, or the like).

With the recent increase in the recording density of a magnetic disk, it has become increasingly important to reduce, as much as possible, the distance between a magnetic head and the surface of a magnetic disk, namely the amount by which the head floats above the surface of the disk. For this reason, it is required to minimize the roughness of the surface of the magnetic disk. In order to lap the surface of magnetic disk medium so as to minimize the surface roughness, the surface is moved while the lapping tape is forced onto the surface.

In producing magnetic disks, the following are some examples of conventional methods known in the art employing lapping tape: the method disclosed in Japanese Unexamined Patent Publication No. 56-130834 in which the surface of lapping tape is previously coated with lubricant, the tape being used to lap after it has been dried at a temperature between 30° to 50° C.; and the method disclosed in Japanese Unexamined Patent Publication No. 56-130836 in which a magnetic disk is prepared which has a magnetic film formed on a substrate and having a large surface-roughness occurring by a binder of thermosetting resin such as epoxy resin, phenolic resin, or melamine resin, and by fillers such as alumina powder, and the thus prepared magnetic disk is lapped while being moved relative to a magnetic head on which a lapping tape impregnated with a lubricant such as fluorocarbon is mounted.

The conventional lapping tape on which abrasive particles of $Al_2O_3$, SiC or the like are provided is insufficient to adequately cut protrusions or heads occurring by fillers protruding from the surface of the magnetic medium when used in lapping the surface of the medium in which such fillers (particles of $Al_2O_3$ having a particle size of 0.5 to 1.3 $\mu$m) are contained as a durability-and-strength increasing agent, so that the conventional lapping tape is impossible to reduce the distance by which a magnetic head floats above the surface. On the other hand, with the type of a lapping tape incorporating abrasive particles of diamond which have an improved ability to cut the protrusions caused by fillers, the following problems has occurred. Namely, when the proportion of abrasive particles contained in a lapping tape is low, the resulting magnetic medium surface lapped by the lapping tape will have a lot of flaws caused as a result of the lapping working. Conversely, when the proportion of abrasive particles adopted is sufficient for the formation of chip pockets which can prevent the flaws from being caused, the expense would be too high for mass production of the magnetic disk.

SUMMARY OF THE INVENTION

An object of the present invention is to improve the problems of the prior art and to provide a method of producing a magnetic disk employing a lapping tape which, when employed to lap the surface of a magnetic recording medium, exhibits an ability to cut protrusions formed by fillers protruding from the surface of the magnetic recording medium in an adequate degree without causing thereon any flaws which are apt to occur in the lapping working.

In order to achieve the above object, the present invention provides a method of producing a magnetic disk in which the surface of a magnetic disk medium is lapped by means of lapping tape provided with abrasive particles of $Al_2O_3$ or SiC, binder resin, and a polyester film, the method comprising the steps of: preparing a lapping tape having an abrasive particle layer in which abrasive particles of diamond are dispersed in each of abrasive particle clusters formed of either $Al_2O_3$ abrasive particles or SiC abrasive particles, which layer has chip pockets provided between two adjacent clusters of said abrasive particle; and lapping the surface of said magnetic disk medium by making use of the thus prepared lapping tape.

BRIEF DESCRIPTION OF THE DRAWINGS

FIG. 4 is a block diagram showing the process of manufacturing the lapping tape;

PREFERRED EMBODIMENT OF THE INVENTION

An embodiment of the invention will now be described in detail with reference to the accompanying drawings.

In this embodiment, the proportion of abrasive particles which is suitable for obtaining the required properties of the lapping tape, i.e. the abrasive particle content which is necessary to form chip pockets so as to prevent flaws from occurring, is set to a value between 50 to 90% by weight with respect to the total weight of the abrasive layer, which abrasive layer consists of: 40 to 89% by weight $Al_2O_3$ abrasive particles or SiC abrasive particles; 1 to 10% by weight diamond abrasive particles which have a high degree of ability to cut fillers; and the remainder binder resin. By thus setting the composition of and the proportion of abrasive particles, it is possible to obtain lapping tape which has the ability to cut the heads of the fillers protruding from the surface of the magnetic disk medium in an adequate degree without causing flaws on the surface of the magnetic disk.

Figure 1:
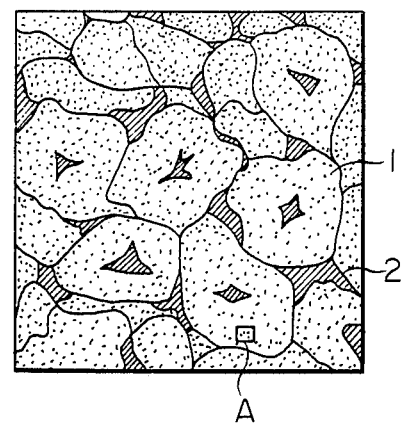
FIG. 1 is a schematic representation showing the surface portion of lapping tape employed in a method of the present invention.
Figure 2:
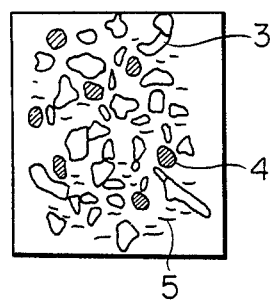
FIG. 2 is a schematic view showing an enlarged part of the lapping tape shown in FIG. 1.
Figure 3:
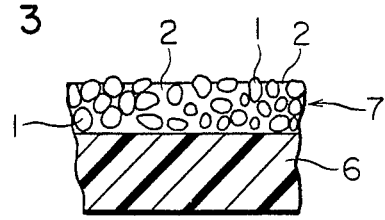
FIG. 3 is a schematic view showing a partial section of the lapping tape.

The lapping tape employed in the method of the invention has an abrasive layer schematically shown in FIGS. 1 and 2, which has a plurality of abrasive particle clusters 1, and chip pockets 2 provided between two adjacent clusters of the abrasive particle. The abrasive particle clusters 1 are each formed of: abrasive particles 3 of $Al_2O_3$ or SiC having a mean particle size of 2 to 9 $\mu$m; diamond abrasive particles 4 having a mean particle size of 1 to 9 $\mu$m dispersed in each of the abrasive particle clusters 1; and a binder resin 5 used in the abrasive layer for bonding the abrasive particles. Referring to FIG. 3, a substrate 6 of the tape is formed of a polyester film having a thickness of about 25 μm, and the abrasive layer 7 thereof has a thickness of about 15 μm. The abrasive layer 7 consists of: 40 to 89% by weight $Al_2O_3$ or SiC abrasive particles; 1 to 10% by weight diamond abrasive particles; and the remainder binder resin. Preferably, the layer 7 should include 60 to 80% by weight $Al_2O_3$ or SiC abrasive particles having a mean particle size of about 3 μm, and 2 to 8% by weight diamond abrasive particles having a mean particle size of about 3 μm.

As shown in FIG. 1, the provision of the chip pockets 2 having an area ratio of 15 to 30% regarding the whole surface area of the abrasive layer which chip pockets exist between adjacent ones of the abrasive particle clusters 1 is a requisite for obtaining a lapped magnetic disk product with a high degree of precision and without any flaws. In order to form this desired structure of the abrasive particle clusters provided with the chip pockets, a high abrasive particle proportion of 50 to 90% by weight is needed. If this high proportion is to be composed solely of the diamond abrasive particles 4 having a high degree of cutting ability, the expense would be too high for mass production. Therefore, in this embodiment of the invention, a structure is adopted in which the main part of the structure of the abrasive particle clusters including the chip pockets 2 is formed of abrasive particles of $Al_2O_3$ or SiC in which diamond abrasive particles 4 are dispersed, thereby obtaining lapping tape which is capable of cutting the heads of fillers protruding from the surface of the disk medium without causing flaws. In this case, it is preferred that each of the chip pockets has a size of 10–100 μm. Thus, the most important features of the present invention comprise the following three points: (a) the material for the abrasive particle layer of the lapping tape includes 40 to 89% by weight $Al_2O_3$ abrasive particles or SiC abrasive particles which form a main part of abrasive particle clusters between adjacent ones of which the chip pockets are provided; (b) the material further includes 1 to 10% by weight diamond abrasive particles which are dispersed in each of the abrasive particle clusters; and (c) the lapping tape is prepared by using the above material, and the magnetic disk is lapped by use of the thus prepared lapping tape so that there is obtained a surface roughness regarding the surface of the thus lapped magnetic disk which roughness ensures that, when the resultant disk is rotated with a detecting head floating 0.14 to 0.19 μm above the surface of the disk, a number of times regarding collision occurring between the detecting head and the fillers becomes substantially zero. This distance of 0.14 to 0.19 μm is called the height for ensuring magnetic head floating.

FIG. 4 shows a specific manner of preparing the lapping tape.

As will be seen from FIG. 4, a lapping tape for use in the method of the invention is prepared in the following manner in accordance with this embodiment: A polyester film having a thickness of about 25 μm cleaned for use was prepared as the substrate of the tape. An abrasive mixture including $Al_2O_3$ or SiC abrasive particles having the mean particle size of 2 to 9 μm, diamond abrasive particles having the mean particle size of 1 to 9 μm, and binder resin of urethane resin was prepared, and the abrasive mixture was then filtered through a filter of 2000 to 6000 mesh. The filtered abrasive mixture was then coated onto the polyester film (Mylar) in a thickness of about 15 μm, and then dried, thereby obtaining the lapping tape employed in the method of the invention. The chip pockets are holes wherein no substance is present, and they are formed as recesses between two adjacent clusters of abrasive particles during the drying process of the abrasive mixture. If lapping is conducted by using a lapping tape with an abrasive layer having no chip pocket or chip pocket having an area ratio of less than 15% regarding the whole area of the layer, powder resulting from the cutting operation is apt to adhere onto the surface of a lapped disk or is apt to adhere to the abrasive particles, thus resulting in an increase in friction. On the other hand, when a lapping tape is used which has an abrasive layer having abrasive particle cluster and chip pockets, the powder is able to enter the chip pockets, thus it becomes possible to obtain a high degree of precision or improved surface roughness regarding the lapped surface. In brief, the chip pockets provide an escape route for the powder. As mentioned above, another important feature of the invention is the addition of diamond abrasive particles in a small amount.

Figure 5A:
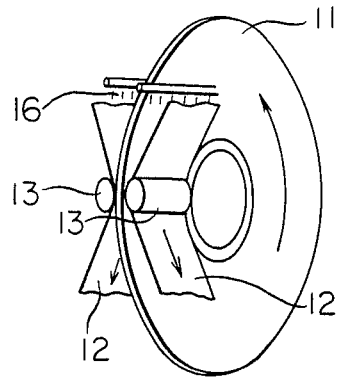
FIGS. 5A and 5B are perspective views showing the states in which a magnetic disk medium is lapped.
Figure 5B:
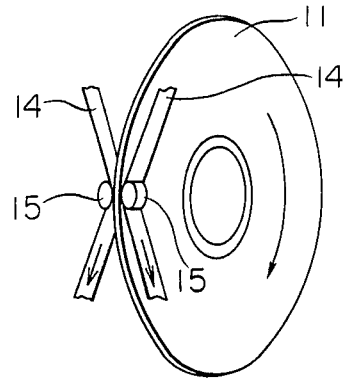

By using the lapping tape having the structure shown in FIGS. 1 and 2, the surface of a magnetic disk 11 was lapped by subjecting the same to a first working A and subsequently to a second working B, which are respectively shown in FIGS. 5A and 5B. First, as shown in FIG. 5A, the following lapping was conducted: a lapping tape 12 (the abrasive layer 7 of which includes 73% by weight $Al_2O_3$ abrasive particles having a mean particle size of 3 μm, and the remainder binder resin) was forced onto the surface of the magnetic disk medium 11 through a roller 13 with force of 6 gf while moving at a running speed of 500 mm per min., and simultaneously the disk medium 11 was rotated at a rotational speed of 100 rpm, thereby lapping the surface of the disc medium 11 for 70 sec. while supplying a grinding fluid 16 thereto (working A). Subsequently, as shown in FIG. 5B, the following lapping was conducted: a lapping tape 14 (the abrasive layer 7 of which includes 60% by weight $Al_2O_3$ abrasive particles having a mean particle size of 3 μm, 5% by weight diamond abrasive particles having a mean particle size of 3 μm, and the remainder binder resin) was forced on the surface of the magnetic disk medium 11 which had been prepared by the lapping effected in the working A, through a roller 15 with force of 70 gf while the tape was moving at a running speed of 250 mm per min., and simultaneously the disc medium 11 was rotated at a rotational speed of 500 rpm, while at the same time the roller 15 and the tape 14 were moved in the radial direction at a movement speed of 150 mm per min, thereby lapping the surface of the disk medium disc 11 for a period of time during which the roller 15 and the tape 14 make one or two reciprocating movements in a radial direction (working B). By this working A and the subsequent working B, it was made possible to cut the heads of the filler protruding from the surface of the magnetic disk medium in an adequate degree without causing flaws, thereby enabling a reduction in the roughness of the surface of the magnetic disk. Consequently, it became possible to reduce the height for ensuring the magnetic head floating which was about 0.25 μm in the prior art to a value of 0.14 to 0.19 μm regarding a magnetic disk produced in accordance with the invention.

Figure 6:
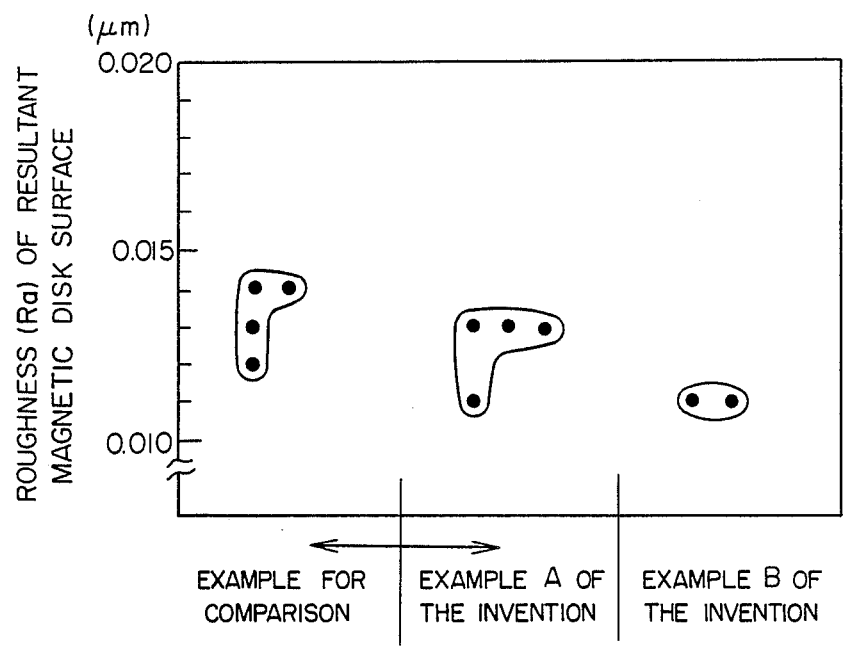
FIGS. 6 and 7 are graphs showing the roughness of the surface of the magnetic disk obtained by the method of the present invention in comparison with a conventional method.
Figure 7:
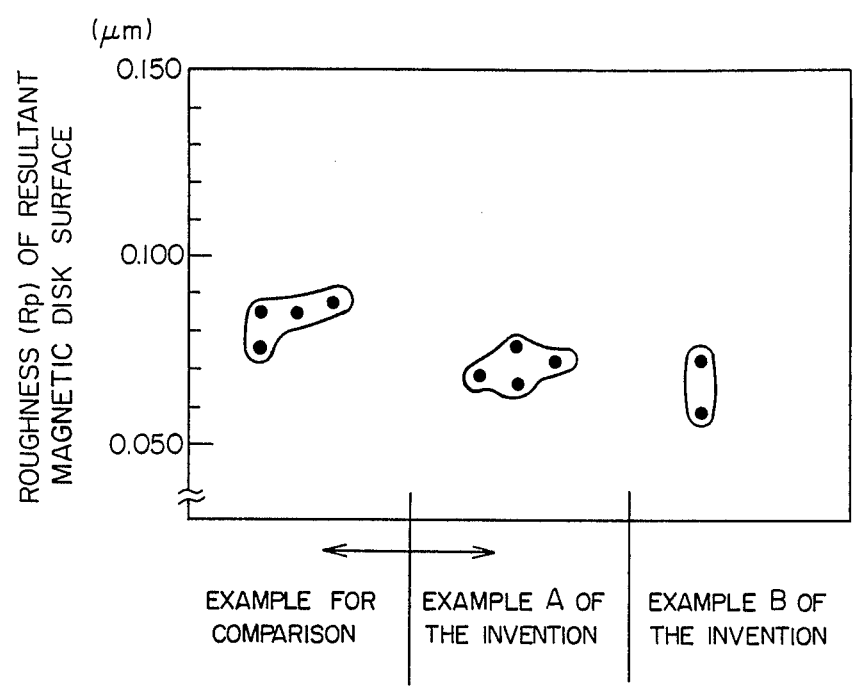

FIGS. 6 and 7 are graphs showing the difference between the roughness of the surface of magnetic disks A and B produced by the method of the invention including the lapping process shown in FIGS. 5A and 5B and that of a magnetic disk (hereinafter referred to as "the comparative disk") produced by a conventional method. In production of the comparative magnetic disk, lapping tapes including no diamond abrasive particles were used for conducting both the workings A and B to lap the surface of the comparative magnetic disk. On the other hand, the magnetic disk A of the invention was lapped in the following manner: in the working A, a lapping tape including no diamond abrasive particles was used in the same manner as in the lapping of the comparative magnetic disk, while another lapping tape including 5% by weight diamond abrasive particles was used in the lapping work B in such a first manner that this lapping tape was reciprocally moved in the radial direction of a magnetic disk one time in a case of Example A. In addition, another magnetic disk B of the invention was lapped in the work B in such a second manner that the lapping tape is reciprocally moved in the radial direction two times in a case of Example B. In FIGS. 6 and 7, the symbols Ra and Rp indicate the roughness of the surface of the resultant magnetic disks. Ra is the Center Line Average which is the arithmetical value of all distance of the roughness profile from its center line, while Rp is Levelling Depth which is the vertical distance between the highest point and the center line of the roughness profile R within the measured length. From FIGS. 6 and 7, it is clearly seen that the surfaces of the magnetic disks A and B produced by the method of the invention possess roughness values which are smaller than those of the comparative magnetic disk produced by the conventional method using the conventional tape.

As described above, according to the present invention, since the lapping process for lapping the surface of a magnetic disk medium can be performed by using a lapping tape which is capable of sufficiently cutting the heads of fillers protruding from the surface of the magnetic medium without causing flaws, it becomes possible to provide an improved roughness for the surface of the magnetic disk, thus enabling to reduce a value regarding the height for ensuring magnetic head floating and to enhance the recording density of a magnetic disk.

What is claimed is:

1. A method comprising the steps of:
   preparing a lapping tape having an abrasive particle layer provided with abrasive particle clustes and chip pockets having an area of 15-30% of entire surface of said layer formed between adjacent two clusters, (each of said clusters having abrasive particles of $Al_2O_3$ or SiC and abrasive particles of diamond, and binder resin said abrasive particle layer comprising 40 to 89% by weight $Al_2O_3$ or SiC abrasive particles, and 1 to 10% by weight diamond abrasive particles, and
   lapping the surface of said magnetic disk medium by using the thus prepared lapping tape.

2. A method as claimed in claim 1 wherein said abrasive particle layer further includes the remainder binder resin while the total weight of these abrasive particles is 50 to 90 wt %, the mean particle size of said $Al_2O_3$ abrasive particles or said SiC abrasive particles being 2 to 9 $\mu$m, the mean particle size of said diamond abrasive particles being 1 to 9 $\mu$m.

3. A method as claimed in claim 1, wherein said chip pockets have an area of 15 to 30% of the entire area of said abrasive particle layer on the surface of said lapping tape, and each of said chip pockets has a size of 10 to 100 $\mu$m.

4. A method as claimed in claim 1, wherein said step of lapping the surface of said magnetic disk medium comprises the steps of:
   lapping the surface of said magnetic disk medium by use of a lapping tape containing 50 to 90% by weight $Al_2O_3$ or SiC abrasive particles, and the remainder binder resin,
   subsequently lapping the surface of the resultant magnetic disk medium by use of another lapping tape containing 50 to 90% by weight abrasive particles consisting essentially of 40 to 89% by weight $Al_2O_3$ or SiC abrasive particles, 1 to 10% by weight diamond abrasive particles, and the remainder binder resin, thereby obtaining a value in the range of 0.14 to 0.19 $\mu$m regarding the height for ensuring magnetic head floating.

5. A lapping tape for producing a magnetic disk, comprising:
   a substrate made of a tape of plastics;
   an abrasive layer provided on the substrate and having abrasive particle clusters and chip pockets having an area of 15-30% of entire surface of said layer formed between adjacent two clusters, each of said clusters having abrasive particles of $Al_2O_3$ or SiC, 40-89% by weight abrasive particles of 1-10% by weight diamond and a binder resin bonding these abrasive particles each other.

6. A lapping tape as claimed in claim 5, wherein said abrasive layer of said lapping tape comprises: 40 to 89% by weight $Al_2O_3$ abrasive particles or SiC abrasive particles; 1 to 10% by weight diamond abrasive particles; and the remainder binder resin while the total weight of these abrasive particle is 50 to 90%, the mean particle size of said $Al_2O_3$ abrasive particles or said SiC abrasive particles being 2 to 9 $\mu$m, the mean particle size of said diamond abrasive particles being 1 to 9 $\mu$m.

7. A lapping tape as claimed in claim 5, wherein said chip pockets have an area of 15 to 30% of the entire area of said abrasive layer provided on the surface of said lapping tape, and each of said chip pockets has a size of 10 to 100 $\mu$m.

8. A lapping tape as claimed in claim 5, wherein said substrate is made of a polyester film.

9. A lapping tape as claimed in claim 8, wherein said polyester film has a thickness of about 25 $\mu$m.

10. A method for producing a magnetic disk comprising:
    providing a magnetic disk medium having surface roughness;
    providing a lapping tape comprising a substrate and an abrasive layer provided on said substrate, said abrasive layer comprising a plurality of abrasive particle clusters and chip pockets having an area of 15-30% of entire surface area of layer between portions of adjacent abrasive particle clusters, and said abrasive particle clusters comprising a binder resin, 40-89% by weight abrasive particles of $Al_2O_3$ or SiC, and 1-10% by weight abrasive particles of diamond;
    lapping a surface of said magnetic disk medium with said abrasive layer of said lapping tape, thereby reducing the surface roughness of said magnetic disk medium.

11. A method for producing a magnetic disk according to claim 10, wherein said lapping is accomplished by forcing said abrasive layer of said lapping tape onto said surface of said magnetic disk medium while moving said surface of said magnetic disk medium and said lapping tape relative to one another.

12. A method for producing a magnetic disk according to claim 10, wherein said abrasive layer consists essentially of 40 to 89% by weight $Al_2O_3$ abrasive particles or SiC abrasive particles, 1 to 10% by weight diamond abrasive particles and the remainder binder resin, while the total weight of said $Al_2O_3$ abrasive particles or SiC abrasive particles, and said diamond particles is 50 to 90 wt % of said abrasive layer.

13. A method for producing a magnetic disk according to claim 12, wherein a mean particle size of said $Al_2O_3$ abrasive particles or said SiC abrasive particles is 2 to 9 μm and the mean particle size of said diamond abrasive particles is 1 to 9 μm.

14. A method for producing a magnetic disk according to claim 1, wherein each of said chip pockets has a size of 10 to 100 μm.

15. A method for producing a magnetic disk according to claim 10, wherein said binder is urethane resin.

16. A method for producing a magnetic disk according to claim 10, wherein said substrate is made of a polyester film having a thickness of approximately 25 μm and said abrasive layer has a thickness of approximately 15 μm.

17. A method for producing a magnetic disk according to claim 12, wherein said abrasive layer consists essentially of 60 to 80% by weight $Al_2O_3$ abrasive particles or SiC abrasive particles, 2 to 8% by weight diamond abrasive particles and the remainder binder resin.

* * * * *

UNITED STATES PATENT AND TRADEMARK OFFICE
CERTIFICATE OF CORRECTION

PATENT NO. : 4,762,534
DATED : August 9, 1988
INVENTOR(S) : ITO et al

It is certified that error appears in the above-identified patent and that said Letters Patent is hereby corrected as shown below:

Col. 5, line 46, Claim 1, line 1, after "method" insert
--of producing a magnetic disk by lapping a magnetic disk medium,--

Col. 5, line 48, Claim 1, line 3, change "clustes" to
--clusters--

Col. 5, line 51, Claim 1, line 6, delete "("

Col. 5, line 53, claim 1, line 8, delete ","

Col. 5, line 53, Claim 1, line 8, after "resin" insert --,--

Col. 6, line 26, Claim 5, line 8, before "abrasive" insert
--40 - 89% by weight--

Col. 6, line 27, Claim 5, line 9, delete "40 - 89% by weight

Signed and Sealed this

Twenty-sixth Day of February, 1991

Attest:

HARRY F. MANBECK, JR.

*Attesting Officer*            *Commissioner of Patents and Trademarks*